(12) United States Patent
Flach et al.

(10) Patent No.: US 8,585,948 B2
(45) Date of Patent: Nov. 19, 2013

(54) METHOD AND DEVICE FOR APPLYING A REFERENCE MARK ON A ROTOR BLADE FOR A WIND POWER PLANT

(75) Inventors: Christian Flach, Schacht Audorf (DE); Lenz Simon Zeller, Kiel (DE)

(73) Assignee: Repower Systems SE, Hamburg (DE)

( * ) Notice: Subject to any disclaimer, the term of this patent is extended or adjusted under 35 U.S.C. 154(b) by 111 days.

(21) Appl. No.: 13/028,726

(22) Filed: Feb. 16, 2011

(65) Prior Publication Data

US 2011/0204542 A1    Aug. 25, 2011

(30) Foreign Application Priority Data

Feb. 23, 2010 (DE) .......................... 10 2010 002 230

(51) Int. Cl.
 *B28B 1/48* (2006.01)
(52) U.S. Cl.
 USPC .......................................................... 264/154
(58) Field of Classification Search
 USPC .......................................................... 264/154
 See application file for complete search history.

(56) References Cited

U.S. PATENT DOCUMENTS

2010/0028096 A1    2/2010 McCracken
2010/0121606 A1 *  5/2010 Vestergaard ................. 702/167

FOREIGN PATENT DOCUMENTS

| DE | 19628073 C1 | 9/1997 |
| DE | 202007008066 U1 | 10/2008 |
| DE | 202007008066 U1 | 11/2008 |
| JP | 2003-39217 | 2/2003 |
| JP | 2003039217 A | 2/2003 |
| WO | 2008/092461 A2 | 8/2008 |
| WO | WO 2008/092461 * | 8/2008 |
| WO | 2008/148370 A2 | 12/2008 |

OTHER PUBLICATIONS

European Search Report, EP Application No. 11 152 225.6 plus partial English translation, 11 pages.

* cited by examiner

*Primary Examiner* — Larry Thrower

(74) *Attorney, Agent, or Firm* — Rankin, Hill & Clark LLP

(57) ABSTRACT

A method, a device (20), an arrangement and a use for applying a reference mark on a rotor blade (1) for a wind power plant. After producing the rotor blade (1) in a manufacturing mold (34, 34', 35) and before removing the rotor blade (1) from the manufacturing mold (34, 34', 35), a reference mark is applied in the area of a rotor blade root (5) of the rotor blade (1) by means of a marking device (23), which is connected or can be connected to a holding device (21) disposed at a predetermined or predeterminable position on the manufacturing mold (34, 34', 35).

3 Claims, 4 Drawing Sheets (state of the art)

(state of the art)

Fig. 3
Fig. 4
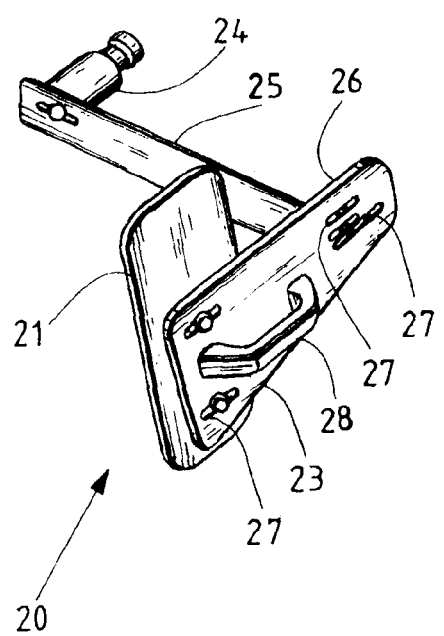
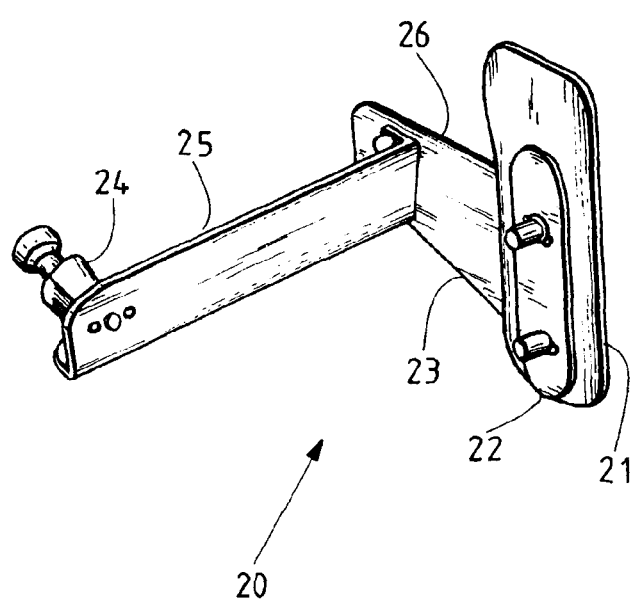

METHOD AND DEVICE FOR APPLYING A REFERENCE MARK ON A ROTOR BLADE FOR A WIND POWER PLANT

BACKGROUND OF THE INVENTION

1. Field of the Invention

The invention relates to a method, a device and an arrangement for applying a reference mark on a rotor blade for a wind power plant, as well as to a use.

2. Description of Related Art

During operation of wind power plants, imbalances that arise due to differing settings of the rotor blade angles of the rotor blades of a rotor, lead to a reduction of the attainable energy yield. At the same time, these imbalances endanger the integrity of the wind power plant. Therefore, during setup and operation of wind power plants it must be ensured that the rotor blades of the wind power plant are operated with identical and predetermined adjustment angles. For this purpose, the rotor blades typically have reference marks, also called 0°-marks or zero marks, which are aligned with marks on the central rotor hub.

It has been shown in practice that faulty reference marks lead to rotor imbalances and reduced energy yield. If this is the case, the rotor blades must be recalibrated. An accuracy of at least 0.3° is required; however, an accuracy of less than 0.1° is preferable.

DE 196 28 073 C1 discloses a method for adjusting the blade angle of a wind power plant, according to which the power output of the wind power plant is measured time-resolved over a longer period of time. The power output is assigned to the power contributions of the individual rotor blades. The blade angles of the rotor blades are individually aligned and set in order to minimize differences of individual power contributions that arose, as well as aerodynamic imbalances. Thus, operational durability loads are reduced, and the excitation of a vibration resonant with the rotor speed is prevented.

DE 20 2007 008 066 U1 discloses a device for aligning an angle-adjustable rotor blade of a wind power plant that has at least two reference points which can be arranged in the interior of the rotor blade at predetermined positions to the rotor blade. The device comprises a measuring device with which the position of the reference points can be measured relative to a reference system. Placing the reference points in the interior of the rotor blade creates an option for measuring the rotor blade adjustment angles that is secure, accurate, time-saving and largely independent of the weather.

In a typical method for applying appropriate reference marks, an airfoil template is slid from the outside over a rotor blade, which is then calibrated by means of optical methods with respect to a reference plane, e.g., the rotor plane or the rotor axis plane. With current sizes of wind power plants having rotor diameters of far more than 100 m, applying such a template at over 50 m above the ground is a time consuming and costly measure.

For this reason, it is by now preferred to already provide the rotor blades with reference marks after their production, before they are mounted at a wind power plant. For this purpose, it is known that the position for a zero mark is measured on the outside at the root side end of a rotor blade using an unrolling measurement tape, starting from the separation plane of the rotor blade, i.e., the plane that separates an upper half shell from a lower half shell of the rotor blade. The half shells are typically composed of a composite of multiple layers of glass fiber mats and/or carbon fiber mats, laminated with a resin material.

Finally, jigs are also known which are positioned at the inner surfaces of the blade connection casings. In this method, the attainable accuracy depends on both the positioning accuracy of the casing in the flange, as well as the accuracy of the prior positioning of the flange on the rotor blade. These tolerances add up.

The necessary accuracy of 0.3°, preferably 0.1°, is not possible with the previously described methods because for the zero angle to be marked at the blade root, the tilt angle of the rotor blade in the power area is significant, that is, in the outer area arranged toward the tip of the rotor blade which yields the greatest power contribution at the rotor blade. Correspondingly, the 0° angle is defined relative to the leading edge of the rotor airfoil in the power region, relative to which the leading edge of the rotor airfoil at the blade root is rotated by a specific angle. Therefore, the zero mark in general does not correspond with the position of the airfoil leading edge at the blade root.

The rotor blade is very flexible and bends under its own weight. If the airfoil section or the airfoil leading edge in the power region is placed vertically, it is not guaranteed that the blade root side region is set relative to the former in a position or angular position reproducible to 0.1° to 0.3°. Due to individual tensions and distortions of each rotor blade, variations result in the angular relations and thus, in the reference mark points, which lie above the desired range of accuracy.

In contrast to this prior art, the object of the present invention is to be able to apply reference marks on a rotor blade for a wind power plant in a reproducible manner and with high accuracy.

BRIEF SUMMARY OF THE INVENTION

This objective is solved by a method for applying a reference mark on a rotor blade for a wind power plant, wherein after producing the rotor blade in a manufacturing mold, and before removing the rotor blade from the manufacturing mold, a reference mark is applied in the area of a rotor blade root of the rotor blade by means of a marking device which is connected or can be connected to a holding device disposed at a predetermined or predeterminable position at the manufacturing mold.

The method according to the invention has the advantage that the reference mark is added in a production step in which the rotor blade is still located in its manufacturing mold, so that its position is defined very precisely over the entire length of the rotor blade. The mark is applied by means of a tool which is securely connected to the mold, and thus also has a precisely defined position relative to the rotor blade in its entire length. The influence of the flexibility of the rotor blade material causing the inaccuracies is suppressed.

For this purpose, it is advantageous if the marking device is connected to the holding device after manufacturing the rotor blade in the manufacturing mold. In particular, for the resin infusion method, this procedure has the advantage that the marking device is not disruptive, or is not in the way while resin is injected into the mold. This promotes the complete integrity of the material of the rotor blade at its blade root side end.

The reference mark is advantageously applied at an inner side of the rotor blade. This creates a particularly weather-independent and time-saving option for measuring the rotor blade adjustment angles, which brings particular advantages, especially in the case of offshore wind power plants which are subjected to harsh climatic conditions.

A preferred manner for applying a reference mark is that the reference mark is created by means of a bore through a drilling template of the marking device. A bore, which in particular does not penetrate more than 5 mm (millimeter) deep into the material of the rotor blade, is easily visible and simple to measure without negatively impacting the laminated material and with it the structural strength of the rotor blade.

The object of the invention is also solved by a device for applying a reference mark on a rotor blade for a wind power plant comprising a holding device and a marking device with a marking element, wherein the holding device is designed to be connected or connectable to a manufacturing mold for a rotor blade in a predetermined or predeterminable position, in a region of a blade root side end of the rotor blade, wherein the marking device is designed to be connectable or connected to the holding device.

The device according to the invention has the advantage already mentioned for the method according to the invention that a holding device for the marking device is disposed at a predetermined or predeterminable position at the manufacturing mold, and a marking device is connected to the holding device. This way, using the marking device and the holding device, the marking element receives a predetermined and reproducible position with respect to the manufacturing mold for the rotor blade as well as for each rotor blade disposed in and manufactured in the mold including with respect to its power area, whose orientation is significant for the zero mark.

The marking element advantageously comprises a drill or a color applicator, for example, a print head, a brush with paint, or a pen. The marking element preferably comprises a drilling template. Within the scope of the invention, a drilling template is understood to be a guiding body having a central through-opening for a drill which can be applied in a fixed and predefined position by means of the drilling template.

The marking element is advantageously movable, particularly detachably securable, in a radial direction of a rotor blade root side area of the manufacturing mold. Within the scope of the invention, the radial direction is defined by means of the conventional shape of the rotor blade root side end of a rotor blade which is conventionally circular. The radial direction is a direction towards the midpoint of this circle to or away from the midpoint of the circle. Such movement does not change the angular position of the marking element. The radial mobility ensures that the marking element can be adapted to different thicknesses of rotor blades in the blade root side area of the rotor blade, or for example, that a drill or a color applicator can approach the surface of the rotor blade.

Preferably, it is provided that the marking element is disposed at an inner surface of a rotor blade in the manufacturing mold when the marking device is connected to the holding device. Markings disposed in this manner are protected to a large degree from the influences of the weather, and therefore are particularly durable.

The object of the invention is further solved by an arrangement for applying a reference mark on a rotor blade for a wind power plant comprising a manufacturing mold for a rotor blade and a device according to the invention, previously described, wherein the holding device is connected or can be connected to the manufacturing mold in a predetermined or predeterminable position in an area of the blade root side end of the rotor blade. This arrangement has the previously described advantages according to the invention.

In a preferred further development, the holding device is integrated into the manufacturing mold. In this case, a part of the manufacturing mold is designed as a holding device. Alternatively, the holding device is advantageously detachably connected to the manufacturing mold.

Finally, the object of the invention is also solved by a use of a device having a holding device and a marking device, in particular a device according to the invention previously described, for applying a reference mark on a rotor blade for a wind power plant, that is characterized in that the holding device and the marking device during application of the reference mark on the rotor blade are disposed in a predetermined or predeterminable position at a blade root side end of a manufacturing mold for the rotor blade. The previously described advantages also exist for the use according to the invention.

BRIEF DESCRIPTION OF THE DRAWINGS

The invention is described below, without restricting the general idea of the invention, using exemplary embodiments with reference to the drawings, whereby we expressly refer to the drawings with regard to the disclosure of all details according to the invention that are not explained in greater detail in the text. They show.

DETAILED DESCRIPTION OF THE INVENTION

In the following figures, the same or similar types of elements or corresponding parts are provided with the same reference numbers so that a corresponding re-introduction is omitted.

Figure 1:
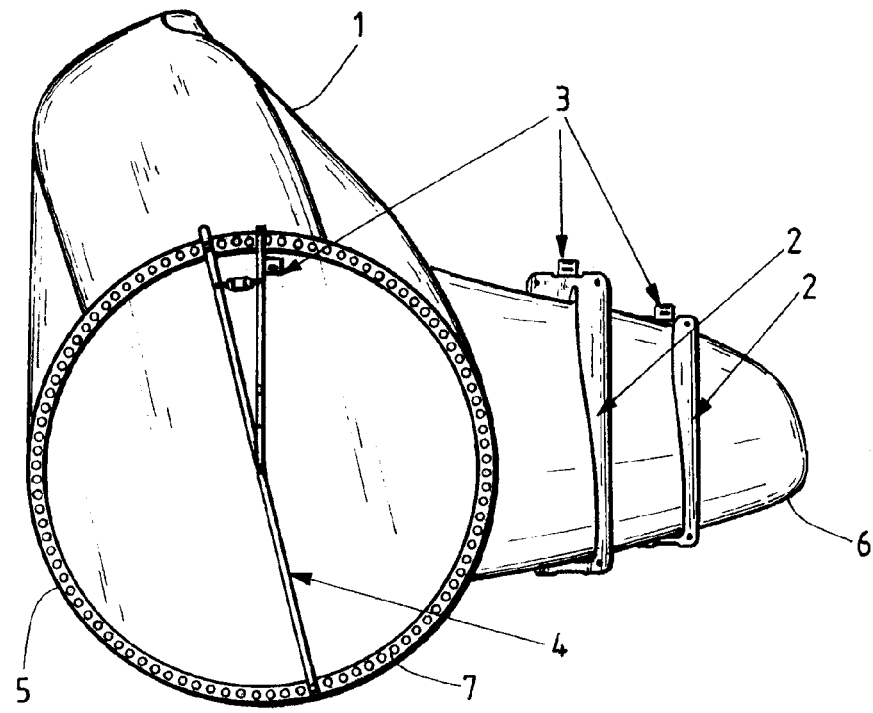
FIG. 1 a schematic representation of a known method for applying a reference mark, FIGS. 2a), 2b) schematic representations of another known method for applying a reference mark, FIG. 3 a perspective view of a device according to the invention in schematic representation, FIG. 4 a further perspective view of the device according to FIG. 3 in a schematic representation, FIG. 5 a schematic representation of the arrangement according to the invention in a perspective view, and FIG. 6 a schematic sectional representation through a marking device according to the invention in perspective view.

FIG. 1 schematically shows a perspective view of the blade root side end of a rotor blade 1 with respect to a known method for applying a reference mark or zero mark.

The rotor blade root 5 supports a circular blade connection casing 7. The power area of the rotor blade 1, which ends in the rotor blade tip 6, is represented perspectively behind in this image.

For applying a reference mark, the rotor blade is placed so that the power area is vertical. For this purpose, two airfoil templates 2, which are each equipped with an inclinometer 3 or inclination sensor 3, are slid onto two different positions in the power area of the rotor blade 1. Using their display, it is determined when the power area of the rotor blade 1 is vertical.

A 0° device 4 is disposed in the blade connection casing 7 for applying a zero mark in the area of the blade root. The 0° device comprises an arm whose length corresponds to the diameter of the rotor blade root 5, and a second arm which is half as long and is hinged to the first arm at the midpoint of the rotor blade root 5. The first arm is oriented to the alignment of the rotor blade 1 in the area of the blade root 5 and forms an angle to the power area. The shorter, second arm is equipped with an inclinometer 3 and is used for measuring the zero angle or a zero mark.

The method shown in FIG. 1 leads to a reference mark or zero mark that cannot be precisely reproduced because the power area of the rotor blade 1 and the root side area of the rotor blade 1 cannot be disposed, reproducibly exactly and without stress, with respect to each other.

Figure 2:
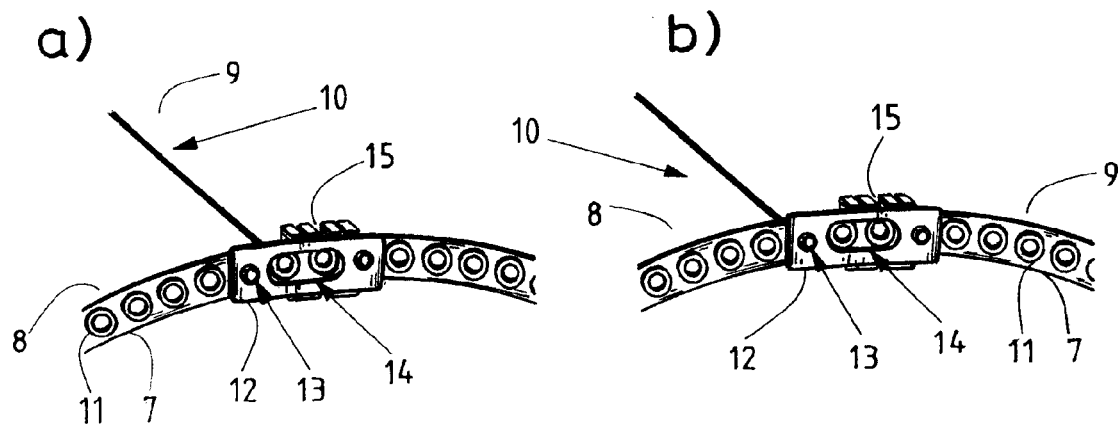

FIG. 2a) schematically represents the blade root side end of a rotor blade with respect to a further method of the prior art. This comprises two half shells of a trailing edge 8 and a leading edge 9 of the rotor blade which abut together at a common abutting edge 1D. For creating a 0°-mark, a jig 12 is placed on the blade connection casing 7.

The jig 12 comprises a reference pin 13 and a viewing window 14 through which bolts 11 of the blade connection casing 7 can be seen. Above and below the rotor blade, the jig comprises marking flags 15 between which a zero mark can be placed.

FIG. 2b) shows that the jig 12 is slightly shifted with respect to the position in FIG. 2a). This makes it clear that the accuracy of this method depends on the correct bolts 11 appearing in the viewing window 14. A systematic error source arises in this context when an incorrect pair of bolts 11 is used as the reference point or guiding point for positioning the jig 12.

Furthermore, the blade connection casing 7 cannot be precisely and reproducibly placed on the blade root side end of the shell such that it is also not guaranteed that the bolts 11 of the blade connection casing 7 take up the same relative position, for example With respect to the abutting edge 10. This leads to a further source of inaccuracy during application of marking positions.

FIG. 3 shows a schematic representation of a device according to the invention for applying reference marks in rotor blades. The device 20 comprises a holding device 21 and a marking device 23. The holding device 21, which can be securely attached to a manufacturing form for rotor blades represented in FIG. 5, is designed planar in this example embodiment.

The marking device 23 in FIG. 3 comprises a drilling template 24 which is disposed on a support arm 25 that for its part is connected to a spacer 26. This spacer 26 can be fastened or, in FIG. 3, is fastened, to the holding device 21, by means of screws through the elongated holes 27. The support arm 25 is also fastened to the spacer 26 using elongated holes 27. The elongated holes 27 are oriented so that a variation of the position of the screws in the elongated holes 27 leads to a radial displacement of the position of the drilling template 24 with respect to a circular blade connection casing 7 or a circular rotor blade root. The marking device 23 additionally has a handle 28 with which it can be handled easily.

FIG. 4 schematically represents the device 20 according to the invention according to FIG. 3 from another perspective. In this rearward perspective, it can be seen that the support arm 25 is designed as an angular element and that the holding device 21 comprises a rearward fastening plate 22. This comprises bore holes for screws by means of which the fastening plate 22 as well as the holding device 21 can be connected to a manufacturing mold.

Figure 5:
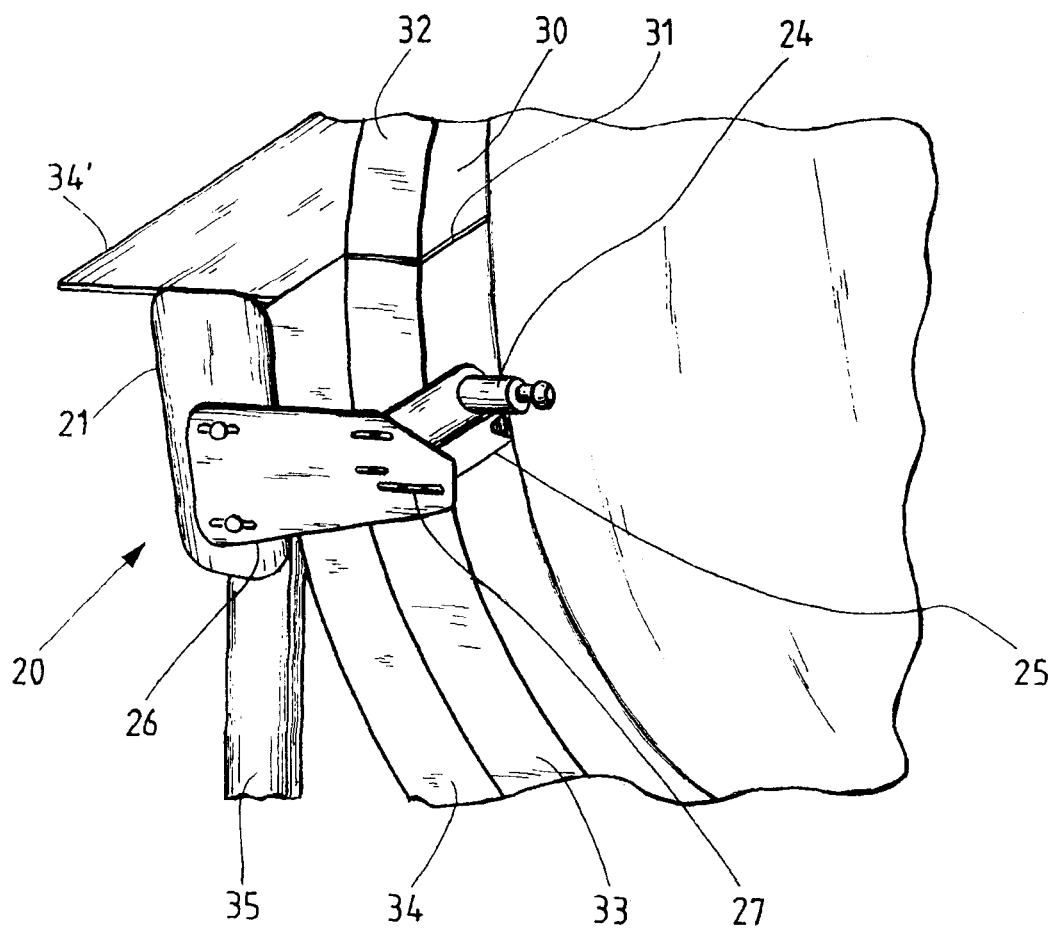

FIG. 5 schematically represents an arrangement according to the invention with a view into the blade root side end of a manufacturing mold 34 with an already produced rotor blade therein. The represented interior 30 of the rotor blade is composed of an upper half shell 32 and a lower half shell 33 which abut together at an abutting edge 31. The lower half shell 33 is supported in the manufacturing mold 34. The manufacturing mold ends in the area of the abutting edge 31 in an outward branching closing surface 34'. The manufacturing mold 34 comprises a support column 35 which supports the closing surface 34'.

The holding device 21 is attached to the manufacturing mold 34, wherein it is disposed at a fixed, predetermined position with respect to the manufacturing mold 34. In FIG. 5, the spacer 26 from FIGS. 3 and 4 is attached to the holding device 21; at its opposite end, the support arm 25 is attached in elongated holes 27. The drilling template 24 is disposed at the rear end of the support arm. It has a funnel shaped application template into which a drilling tool can be introduced in order to reach, guided through the drilling template, the interior side of the lower half shell 33, and to generate a reference mark or zero mark there. The length of the drilling template 24 and a drilling tool are preferably selected such that the drilling tool extends only minimally, for example 5 mm, beyond the drilling template 24 so that only a shallow bore is applied into the laminate of the lower half shell 33.

Figure 6:
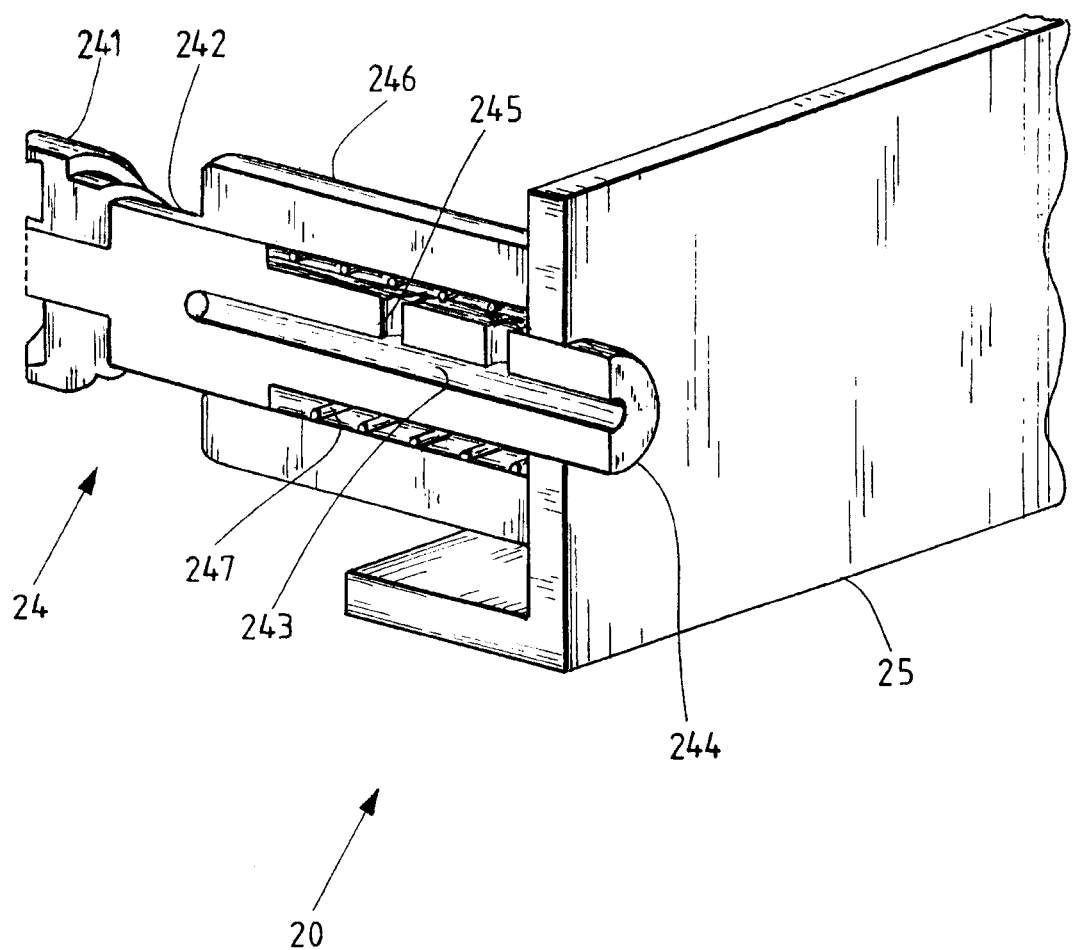

FIG. 6 schematically shows a cross-section through the drilling template 24 and the angular support arm 25. At the input side end of the drilling template there is provided an application template 241 upon which a chuck can be placed, for example. For this purpose, the application template 241 is preferably rotatable. The application template 241 is followed by an insert member 242 which has a guide bore 243 for a drilling tool which ends in an end face 244. The insert member 242 penetrates the support arm 25. In the active state, a drilling tool is led through the guide bore 243 of the insert member 242 and extends somewhat beyond the end face 244 of the insert member 242.

The insert member 242 comprises screw bores 245 for set screws, for example, in order to fix a drill in the guide bore 243.

The insert member 242 is supported in a guiding body 246 which is securely fastened to the support arm 25. This comprises, in a cylindrical interior, a spring screw 247, against whose resistance the insert member 242 is pressed in the direction of a rotor blade. The insert member 242 is supported rotatably within the guiding body 246.

All named characteristics, including those taken from the drawings alone, and individual characteristics, which are disclosed in combination with other characteristics, are considered individually and in combination as essential for the invention. Embodiments according to the invention can be fulfilled through individual characteristics or a combination of several characteristics.

LIST OF REFERENCE NUMBERS

1 Rotor blade
2 Airfoil template
3 Inclinometer
4 0° device for the blade root
5 Rotor blade root
6 Rotor blade tip
7 Blade connection casing
8 Trailing edge
9 Leading edge
10 Abutting edge
11 Bolt
12 jig
13 Reference pin
14 Viewing window
15 Marker flags
20 Device for applying a reference mark
21 Holding device
22 Fastening plate
23 Marking device 24 Drilling template
241 Application template
242 Insert member
243 Guide bore
244 End face
245 Screw hole
246 Guiding body
247 Spring screw
25 Support arm
26 Spacer
27 Elongated hole
28 Handle
30 Interior of a rotor blade
31 Abutting edge
32 Upper half shell
33 Lower half shell
34 Manufacturing mold for the lower half shell
34' Upper closure of the manufacturing mold
35 Support column

The invention claimed is:

1. A method for applying a reference mark on a rotor blade (1) for a wind power plant, comprising the step of after producing the rotor blade (1) in a manufacturing mold (34, 34', 35) and before removing the rotor blade (1) from the manufacturing mold (34, 34', 35) applying a reference mark in the area of a rotor blade root (5) of the rotor blade (1) by means of a marking device (23), which is connected to a holding device (21) disposed at a predetermined or predeterminable position on the manufacturing mold (34, 34', 35) wherein the reference mark is created by means of a bore through a drilling template (24) of the marking device (23).

2. The method according to claim 1, wherein after production of the rotor blade (1) in the manufacturing mold (34, 34', 35), the marking device (23) is connected to the holding device (21).

3. The method according to claim 1, wherein the reference mark is applied on an inner side (30) of the rotor blade (1).

* * * * *